United States Patent [19]  [11] 4,013,606
Ballweber et al.  [45] * Mar. 22, 1977

[54] PROCESS FOR PREPARING WATER SOLUBLE IONIC POLYMERS

[75] Inventors: Edward G. Ballweber, Glenwood; Kenneth G. Phillips, River Forest, both of Ill.

[73] Assignee: Nalco Chemical Company, Oak Brook, Ill.

[ * ] Notice: The portion of the term of this patent subsequent to Sept. 7, 1993, has been disclaimed.

[22] Filed: Jan. 31, 1975

[21] Appl. No.: 545,839

Related U.S. Application Data

[63] Continuation of Ser. No. 385,960, Aug. 6, 1973, abandoned.

[52] U.S. Cl. .................. 260/29.4 UA; 260/29.6 H; 260/67.5; 260/72 R; 260/851
[51] Int. Cl.² ......................................... C08L 61/20

[58] Field of Search ........ 260/29.4 UA, 72 R, 67 S, 260/851, 29.62, 67.5, 29.6 H

[56] References Cited

UNITED STATES PATENTS

| | | | |
|---|---|---|---|
| 2,328,901 | 9/1943 | Grimm et al. | 260/67.5 |
| 3,539,535 | 11/1970 | Wisner | 260/72 |
| 3,624,019 | 11/1971 | Anderson et al. | 260/29.6 H |
| 3,790,529 | 2/1974 | Fujimura et al. | 260/72 R |

Primary Examiner—Lorenzo B. Hayes

[57] ABSTRACT

Water soluble ionic polymers are prepared by reacting an ionic formaldehyde adduct containing cationic groups with a water-in-oil emulsion which contains dispersed therein a finely divided water soluble vinyl addition polymer.

10 Claims, No Drawings

PROCESS FOR PREPARING WATER SOLUBLE IONIC POLYMERS

This is a continuation of application Ser. No. 385,960, filed Aug. 6, 1973 now abandoned.

This invention relates to a new and improved method for preparing water soluble cationic and anionic polymers by reacting an ionic formaldehyde adduct containing cationic or anionic groups with a water-in-oil emulsion which contains dispersed therein a finely divided water soluble vinyl addition polymer. The ionic formaldehyde adduct is prepared by reacting formaldehyde with a secondary amine or sulfurous acid and its water soluble salts. When the formaldehyde-secondary amine adduct is reacted with an emulsion containing polymer the resulting product is a cationic polymer. When the adduct of formaldehyde and a compound selected from sulfurous acid and its water soluble salts is reacted with the polymer emulsion an anionic polymer is formed.

U.S. Pat. No. 2,761,834 teaches the reaction of an acrylamide compound with formaldehyde and then reacting with sulfurous acid to form synthetic anionic composition.

U.S. Pat. No. 2,328,901 teaches the reaction of an amine with an aldehyde and then reacting with a water soluble polymeric acrylamide. These particular references teach the formation of an aldehyde adduct which in turn is reacted with polyacrylamide. There have been serious problems with these methods of the prior art. They involve extremely long reaction times and result in polymers which do not have a high number of ionic groups (i.e., cationic or anionic groups).

The method of this invention involves an improved method for preparing water soluble cationic and anionic polymers. The method of this invention involves preparing the ionic formaldehyde adduct and then reacting the adduct with a water-in-oil emulsion which contains dispersed therein a finely divided water soluble vinyl addition polymer. The method of this invention provides to the art a new and improved rapid method for preparing the polymers in a short period of time as well as providing a polymer with improved properties.

OBJECTS

It is therefore an object of this invention to provide an improved method for preparing water soluble cationic and anionic polymers.

Another object of this invention is to provide a method for preparing a water soluble cationic and anionic polymer by reacting a formaldehyde adduct containing cationic or anionic groups with a water-in-oil emulsion which contains dispersed therein a finely divided water soluble vinyl addition polymer.

A further object of this invention is to provide a method for preparing a water soluble cationic polymer by preparing a formaldehyde-dimethylamine adduct and reacting the adduct with a water-in-oil emulsion which contains dispersed therein a finely divided water soluble vinyl addition polymer.

A still further object of this invention is to provide a method for preparing a water soluble anionic polymer by preparing an adduct of formaldehyde and a compound selected from sulfurous acid and its water soluble salts and then reacting the adduct with a water-in-oil emulsion which contains dispersed therein a finely divided water soluble vinyl addition polymer.

A more specific object of the invention is to provide a new and improved method of producing a cationic polymer having a relatively large number of cationic groups from a nonionic polyacrylamide latex and a mixture of formaldehyde and dimethylamine.

Other objects will appear hereinafter.

THE INVENTION

This invention involves a method for preparing water soluble cationic and anionic polymers by preparing an ionic formaldehyde adduct and reacting the adduct with a water-in-oil emulsion which contains dispersed therein a finely divided water soluble vinyl addition polymer.

The Formaldehyde Adduct

This invention involves the formation of two different types of formaldehyde adducts depending upon whether a cationic or anionic polymer is desired. To prepare a cationic polymer it is necessary to form a formaldehyde-secondary amine adduct, preferably a formaldehyde-dimethylamine adduct. The formaldehyde-dimethylamine adduct may be prepared by mixing formaldehyde and dimethylamine. This reaction may take place at ambient temperature or may be performed at elevated temperatures. However, the reaction proceeds at a rapid rate at ambient temperature. The ratio of formaldehyde to dimethylamine may vary over a wide range but the preferred ratio is within the range 10:1 to 1:10. The most preferred ratio of formaldehyde to dimethylamine is 2:1 to 1:2.

The second type of formaldehyde adduct is that formed by reacting formaldehyde and a compound selected from sulfurous acid and its water soluble salts. It is preferred to use in most instances salts of the alkali metals (e.g., sodium or potassium salts). Generally, the most preferred salt used is sodium bisulfite. In addition to using the alkali metal salts in this invention, ammonium and tertiary amine salts of sulfurous acid such as ammonium bisulfite or trimethylamine sulfite may be used. The ratio of formaldehyde to the compound selected from sulfurous acid and its water soluble salts may vary over a wide range but preferably is within the range 10:1 to 1:10. The most preferred range of formaldehyde to the compound selected from sulfurous acid and its water soluble salts is 2:1 to 1:2.

The Emulsion Containing Polymers

The formaldehyde adduct is reacted with a water-in-oil emulsion which contains dispersed therein a finely divided water soluble vinyl addition polymer. In general, the polymer emulsions are stable yet at the same time contain relatively large amounts of polymer. The polymers dispersed in the emulsion are quite stable when the particle size of the polymer is within the range of 2 millimicrons up to about 5 microns. The preferred particle size is within the range of 5 millimicrons and 3 microns.

The stable water-in-oil emulsion comprises:
1. An aqueous phase;
2. A hydrophobic liquid; and
3. A water-in-oil emulsifying agent.

The polymer-containing emulsion used in the practice of this invention usually comprises an aqueous phase ranging between 75 and 95% by weight of the emulsion. The aqueous phase is defined as the sum of the polymer (homopolymer or copolymer) and the water present in the composition. The preferred range is between 75 and 90% by weight of the emulsion. The most preferred range is between 80 and 85% by weight of the emulsion.

In the present invention, the polymer concentration is usually between 20 and 50% by weight of the emulsion. A preferred range is between 25 and 40% by weight of the emulsion. The most preferred range is between 30 and 35% by weight of the emulsion.

The polymers most commonly used in application of this invention are acrylamide polymers which include polyacrylamide and its water soluble copolymeric derivatives such as, for instance, acrylic acid, methacrylic acid, maleic anhydride, acrylonitrile, and styrene. The copolymers contain from about 5 to 95% by weight of acrylamide. The molecular weights of such polymers exceed 500,000.

A polymer also useful in the practice of this invention is hydrolyzed polyacrylamide which has from 1 to 50% of the original carboxamide groups hydrolyzed to carboxyl groups. The molecular weights of the hydrolyzed polyacrylamides range from 500,000 to 1 million or more.

Other water soluble vinyl polymers are described in detail in the following U.S. Pat. Nos. 3,418,237; 3,259,570; and 3,171,805. In examining the disclosure of these patents it will be seen that the water soluble polymers may be either cationic or anionic and, in some instances, the ionic charges are sufficiently slight so that the polymers may be considered nonionic. For example, water soluble polymers and copolymers of allyl amines, diallyl amines, or dimethylaminoethyl methacrylate are cationic. Polymers such as polyvinyl alcohol are nonionic and polymers such as polyacrylic acid or polystyrene sulfonates are anionic. All of these polymers may be used in the practice of this invention. However, the cationic polymers obtained by reacting a nonionic polyacrylamide with a pre-mix of dimethylamine and formaldehyde as herein described are especially useful.

The molecular weight of the polymers described above may vary over a wide range, e.g., 10,000 to 25 million. The preferred polymer has a molecular weight in excess of 1 million.

The organic or oil phase of the emulsion is comprised of an inert hydrophobic liquid. The hydrophobic liquid usually comprises between 5 and 30% by weight of the emulsion. The preferred range is between 10 and 30% by weight of the emulsion. The most preferred range is between 20 and 30% by weight of the emulsion.

The oils used in preparing these emulsions may be selected from a large group of organic liquids which include liquid hydrocarbons and substituted liquid hydrocarbons. Preferred groups of organic liquids are hydrocarbon liquids which include blends of aromatic and aliphatic hydrocarbon compounds, which contain from 4 to 8 carbon atoms. Thus, such organic hydrocarbon liquids as benzene, xylene, toluene, mineral oils kerosenes, naphtha, and in certain instances, petroleums may be used. A particularly useful oil from the standpoint of its physical and chemical properties is the branch-chain isoparafinnic solvent sold by Humble Oil and Refinery Company under the tradename "Isopar M." Typical specifications of this narrow-cut isoparaffinic solvent are set forth below in Table I.

TABLE I

| Specification Properties | Minimum | Maximum | Test Method |
|---|---|---|---|
| Gravity, API at 60/60° F | 48.0 | 51.0 | ASTM D 287 |
| Color, Saybolt | 30 | — | ASTM D 156 |
| Aniline point, ° F | 185 | — | ASTM D 611 |
| Sulfur, ppm | — | 10 | ASTM D 1266 (Nephelometric mod.) |
| Distillation, ° F | | | |
| IBP | 400 | 410 | |
| Dry point | — | 495 | |
| Flash point, ° F (Pensky-Martens closed cup) | 160 | — | ASTM D 93 |

Any conventional water-in-oil emulsifying agent can be used such as sorbitan monostearate, sorbitan monooleate, and the so-called low HLB materials which are all documented in the literature and are summarized in the Atlas HLB Surfactant Selector. Although the mentioned emulsifiers are used in producing good water-in-oil emulsions, other surfactants may be used as long as they are capable of producing these emulsions. The water-in-oil emulsifying agent is usually present in amounts ranging between 0.1 and 3.0% by weight of the emulsion. The preferred range is between 1.0 and 2.0% by weight of the emulsion. The most preferred range is between 1.5 and 2.0% by weight of the emulsion.

The water-in-oil emulsion used in the practice of this invention exhibits the unique ability of rapidly dissolving into aqueous solution. The polymer-containing emulsion releases the polymer in water in the presence of a surfactant in a very short period of time. This inversion technique is described in Anderson et al, U.S. Pat. No. 3,624,019. The surfactant can be added to the latex, to the water used as a diluent or to the adduct.

The Method

Once the formaldehyde adduct is prepared, it is added to the polymer-containing emulsions in the presence of water and a surfactant. Preferably, the adduct is mixed with water and the surfactant and the polymer-containing emulsion is separately mixed with water. Then the two mixtures are combined with high shear mixing. The surfactant causes the emulsion to invert rapidly into an aqueous solution of the polymer and simultaneously the adduct reacts with the polymer.

The ratio of the formaldehyde adduct to the polymer-containing emulsion may vary from 0.1:1 to 10.0:1 and preferably between 0.3:1 to 3.0:1. The most preferred ratio of the formaldehyde adduct to the polymer-containing emulsion is 1:2 to 2:1 based on polymer. The surfactant in the water may vary over a range of 0.01 to 50% by weight based on polymer. However, generally the surfactant concentration is within the range 1.0 to 10% by weight based on polymer.

The preferred surfactants are hydrophilic and are further characterized as being water-soluble. Any hydrophilic-type surfactant such as ethoxylated nonyl phenols, ethoxylated nonyl phenol formaldehyde resins, dioctyl esters of sodium sulfosuccinate, and octyl phenol polyethoxyethanol can be used. Basically any anionic, cationic or nonionic surfactant can be employed in this invention. The surfactants are fully disclosed in U.S. Pat. No. 3,624,019.

The reaction may be performed at ambient temperatures. However, the reactions may be heated to increase the reaction rate. The reaction is an exothermic reaction and is completed at ambient temperature within approximately 20 minutes.

Example 1

| Acrylamide emulsion recipe: | |
|---|---|
| ISOPAR M | 27.6 grams |
| Sorbitan Monostearate | 1.65 grams |
| Water | 40.20 grams |
| Acrylamide | 36.51 grams |
| Sodium Hydroxide | 2.29 grams |
| 2,2'azobis (isobutyronitrile) | 0.07 grams |

The sorbitan monostearate was dissolved in the ISOPAR M and the resulting solution was poured into a two liter glass reactor fitted with a stirrer, thermometer, and nitrogen purge. The monomer solution was prepared by dissolving the acrylamide in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60° C. with agitation. The reaction proceeded for 2½ hours at which time it had reached completion. The resulting product was a stable emulsion.

Example 2

| Acrylamide-acrylic acid emulsion recipe: | |
|---|---|
| ISOPAR M | 28.10 grams |
| Sorbitan Monostearate | 1.85 grams |
| Water | 40.00 grams |
| Acrylamide | 33.90 grams |
| Acrylic Acid | 2.40 grams |
| Sodium Hydroxide | 2.30 grams |
| 2,2'azobis (isobutyronitrile) | 0.07 grams |

As in Example 1, the sorbitan monostearate was dissolved in the ISOPAR M and the resulting solution was poured into a two liter glass reactor fitted with a stirrer, thermometer, and nitrogen purge. The monomer solution was prepared by dissolving the acrylamide and acrylic acid in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60° C. with agitation. The reaction proceeded for 2½ hours at which time it had reached completion. The resulting product was a stable emulsion.

Example 3

| Dimethylaminoethyl methacrylate emulsion recipe: | |
|---|---|
| ISOPAR M | 27.60 grams |
| Sorbitan Monostearate | 1.65 grams |
| Water | 40.20 grams |
| Dimethylaminoethyl methacrylate (DMAEM) | 38.82 grams |
| Sodium Hydroxide | 2.29 grams |
| 2,2'azobis (isobutyronitrile) | 0.07 grams |

The sorbitan monostearate was dissolved in the ISOPAR M and the resulting solution was poured into a 2 liter glass reactor fitted with a stirrer, thermometer, and nitrogen purge. The monomer solution was prepared by dissolving the DMAEM in water. The pH in monomer solution was adjusted to 8.3 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60° C. with agitation. The reaction proceeded for five hours at which time it had reached completion. The resulting product was a stable emulsion.

Example 4

| Acrylamide-methacrylic acid emulsion recipe: | |
|---|---|
| ISOPAR M | 27.6 grams |
| Sorbitan Monostearate | 1.65 grams |
| Water | 40.20 grams |
| Acrylamide | 34.51 grams |
| Methacrylic Acid | 2.31 grams |
| Sodium Hydroxide | 2.29 grams |
| 2,2'azobis (isobutyronitrile) | 0.07 grams |

The sorbitan monostearate was dissolved in the ISOPAR M and the resulting solution was poured into a 2 liter glass reactor fitted with a stirrer, thermometer, and nitrogen purge. The monomer solution was prepared by dissolving the acrylamide and methacrylic acid in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60° C. with agitation. The reaction proceeded for 2½ hours at which time it had reached completion. The resulting product was a stable emulsion.

This invention is further illustrated by the following examples:

EXAMPLE 5

To a 500 ml. flask was added 100 grams of dimethylamine and 100 grams of formaldehyde with mixing. This mixture was agitated for five minutes and 100 grams of this mixture was added with mixing to a 100 gram sample of the latex emulsion of Example 1. This mixture was vigorously agitated for seven minutes.

EXAMPLE 6

The procedure of Example 5 was followed with the latex emulsion of Example 4 being used instead of that of Example 1.

EXAMPLES 7–20

The procedure of Example 6 was used with the ingredients as listed in the table below:

| Example No. | DMA (gms) | CH$_2$O (gms) | Latex | DMA-CH$_2$O (gms) | Latex (gms) |
|---|---|---|---|---|---|
| 7 | 125 | 100 | Ex 4 | 100 | 100 |
| 8 | 150 | 100 | Ex 4 | 25 | 100 |
| 9 | 200 | 50 | Ex 4 | 50 | 100 |
| 10 | 300 | 30 | Ex 4 | 100 | 100 |
| 11 | 50 | 200 | Ex 4 | 100 | 25 |
| 12 | 30 | 300 | Ex 4 | 100 | 50 |
| 13 | 100 | 100 | Ex 2 | 100 | 100 |
| 14 | 200 | 50 | Ex 2 | 50 | 100 |
| 15 | 50 | 200 | Ex 2 | 100 | 50 |
| 16 | 50 | 300 | Ex 2 | 10 | 100 |
| 17 | 100 | 100 | Ex 3 | 100 | 100 |
| 18 | 300 | 30 | Ex 3 | 50 | 100 |
| 19 | 50 | 200 | Ex 3 | 25 | 100 |

-continued

| Example No. | DMA (gms) | CH$_2$O (gms) | Latex | DMA-CH$_2$O (gms) | Latex (gms) |
|---|---|---|---|---|---|
| 20 | 30 | 300 | Ex 3 | 100 | 25 |

DMA - dimethylamine
CH$_2$O - formaldehyde

EXAMPLE 21

The polymers prepared above were tested on a sewage sludge to determine their activity. A 7.7% solids sludge was treated with the polymer and then filtered for three minutes and the resultant filtrate measured.

| Polymer | Dosage (lb/ton) | Filtrate (ml) |
|---|---|---|
| Ex 6 | 0.4 | 163 |
| Ex 6 | 0.8 | 203 |
| Ex 6 | 1.0 | 200 |
| Ex 8 | 0.4 | 186 |
| Ex 8 | 0.8 | 232 |
| Ex 8 | 1.0 | 246 |
| Ex 9 | 0.4 | 176 |
| Ex 9 | 0.8 | 217 |
| Ex 9 | 1.0 | 240 |

All polymers gave similar good results in dewatering the sewage sludge.

EXAMPLE 22

A. 25 ml of water was mixed with 5 grams of a water-in-oil nonionic polyacrylamide latex prepared as in Example 1 at a temperature of about 70° F.

B. A pre-mix was prepared by mixing dimethylamine and formaldehyde (37% aqueous solution) in a 1:1 molar ratio with a total solids content of 30% by weight. 5 grams of said pre-mix were mixed with 65 ml of water and 0.1 gram of surfactant (octylphenol oxyethylated with 10 moles of ethylene oxide) at about 70° F.

C. Composition B was gradually added to A and mixed together with high shear stirring at about 70° F. for 10 minutes. The Brookfield viscosities were measured after 15 minutes.

The foregoing procedure was carried out with a polyacrylamide latex having an intrinsic viscosity of 18.2 and with one having an intrinsic viscosity of 5.4. In each case twelve products were prepared. Products were prepared at 70° F. having ratios of 1:1, 1.5:1, and 2:1, both with and without the addition of Na$_2$SO$_4$; then six identical products were prepared at 40° F. The ratios indicated above refer to the molar ratios of pre-mix (dimethylamine and formaldehyde) to the latexes.

In the preparation of the products at 40° F., everything was cooled to below 40° before mixing, and the products were kept refrigerated. In the products containing Na$_2$SO$_4$, 4% Na$_2$SO$_4$ was used in place of some of the water, so that the final solutions contained 1% Na$_2$SO$_4$. The 18.2 intrinsic products were prepared at 3.0% active, and the 5.4 intrinsic products were prepared at 8.0% active.

Standard filter leaf tests were run on the solutions. Filter medium N.Y. 413 was used as a representative type, and blended Stickney sludge containing 5.1% solids was used. Stickney sludge is a blend of Imhoff and digested sewage sludges from the Stickney plant of the Chicago Sanitary District. Fifteen inches (mercury) of vacuum was used; the sludge sample size was 800 ml, and 80 ml of diluted polymer solution was added. The filter leaf cycle utilized was 30 sec. conditioning at a mixer speed of 90 rpm, 60 sec. immersion in the sludge, and 120 sec. drying. Filtrate volume and filter cake weight were measured. The 40° solutions were diluted with ice water and kept in an ice bath until their addition to the sludge; the 70° solutions were diluted and run in the usual manner. Portions of the 40° products were then allowed to warm to 70° by standing out overnight, then filter leaf tests were run on these also. The 18.2 intrinsic products were tested at dosages of 100–200 lbs/ton (3–6 lbs/ton active) and the 5.4 intrinsic products were tested at dosages of 25–100 lbs/ton (2–8 lbs/ton active).

Colloid titrations were also done to show any differences in percent cationic in the various solutions. The colloid titration gives an estimation of the ionic functionality on polymers (known as percent cationic or cationization) by a method used to determine colloidal charge. This percent cationic value is also a good indication of the percentage of the polymer which has undergone the cationization and wherein 100% would indicate a complete reaction. The method of determination is as follows:

Sufficient cationized product is diluted to one liter with deionized water so that the resulting solution is 0.03% active. A 5 ml aliquot is taken from the resulting solution and put into a 250 ml beaker, so that the sample contains 1.5 mg of active polymer. This sample is diluted to about 100 ml with DI water (deionized water) and 5.00 ml of standard MGC (0.001 N methyl glycol chitosan) is added. The pH of the solution is adjusted to about 4.0, using dilute HCl. Two drops of toluidine blue indicator are added and the solution is titrated with PVSK (0.001 N polyvinyl sulfate potassium salt), while stirring magnetically, to a violet endpoint that persists at least 15 seconds. A blank is titrated with 100 ml of DI water and 5.00 ml MGC to the same endpoint. Calculation:

$$\frac{(\text{Net } PVSK \text{ volume}) (\text{eq. wt}) (0.001) (100)}{1.5 \text{ mg sample}} = \% \text{ cationic}$$

The net PVSK volume represents the volume of PVSK required to titrate the sample after substracting the volume required to titrate the blank. The equivalent weight refers to the molecular weight of a reacted -mer unit, as if it were a cationic monomer.

Another study was done to exemplify the difference in reaction rates between cationized solutions made at 70° and at 40° F., and between the two latexes used above. This involved the preparation of two cationized products from each latex, one at each temperature. As with the 40° reactions before, all components were cooled to below 40° before mixing, then the products were kept refrigerated; and the 70° products were prepared in the usual manner. All solutions had a 1:1 ratio. Colloid titrations were done on these four solutions after 1, 2, 4, 7, 24, 30, and 48 hours to show the progress of the reactions. Additional colloid titrations were done later to confirm the completeness of the reactions.

The effects of added salt and low temperature on the activity of cationized products was determined by running filter leaf tests on the solutions. The activity of the solutions refers to the amount of cake and filtrate the solution is capable of producing in the filter leaf test; i.e., how good a filter aid the product is. Solutions containing 5% product were used, so that the 18.2 intrinsic solutions contained 0.15% active polymer and the 5.4 intrinsic solutions contained 0.4% active. The 18.2 intrinsic solutions were run at dosages of 100–200 lbs/ton on a product basis (3–6 lbs/ton active) and the 5.4 intrinsic solutions were run at dosages of 25–100 lbs/ton product (2–8 lbs/ton active). The 40° solutions were diluted with ice water and kept on ice until the addition to the sludge; the 70° solutions were diluted and run as usual. Portions of the 40° solutions were allowed to warm to 70° by standing overnight, then filter leaf tests were run on these also.

There was no noticeable effect of the low temperature on the activities of the solutions made with the 18.2 intrinsic latex, but a trend was seen with the solutions made with the 5.4 intrinsic latex. In the latter, the 40° solutions generally had the lowest activities, with the 70° solutions slightly higher, and the warmed-up 40° solutions generally the highest.

The data indicated that the products with $Na_2SO_4$ added generally had higher activities than the identical products without the added salt.

The data further indicated that the activities of the products generally increased with the ratio of premix to latex, probably due to the increase in the cationization, as shown by the colloid titrations. The colloid titrations on the 18.2 intrinsic products were done about 2 days after the filter leaf tests and consequently might not show a direct correlation between the activities and the cationizations. Therefore, the colloid titrations on the 5.4 intrinsic products were done on the same day as the filter leaf tests. It was further seen that the solutions made with the 5.4 intrinsic latex generally had higher activities than the solutions made with the 18.2 intrinsic latex.

The effect of low temperature on the rate of the cationization reaction was determined by the other study. This study involved the preparation of two cationized products from each latex, one at each temperature, all at a 1:1 ratio. Colloid titrations were done on these four solutions after 1, 2, 4, 7, 24, 30, and 48 hours of reaction time to show the progress of the reactions. The data clearly show that the cationization reaction is essentially complete at 70° F. after 24 hours. At 40° F., the rate of reaction is about half the rate at 70°. The rate of reaction of the 18.2 intrinsic latex was found to be slightly less than that of the 5.4 intrinsic latex. All solutions had reached their maximum cationization within one week.

The cationized products from 18.2 intrinsic viscosity polyacrylamide at a weight ratio of premix to polymer of 1:1 had cationicity from 63.4% to 71.9%. At a weight ratio of 1.5:1, the cationicity was from 80.4% to 86.8%. At a weight ratio of 2:1 the cationicity was 88.4% to 94%. The 18.2 intrinsic viscosity polyacrylamide has a molecular weight of around 12–14 million.

The cationized products from 5.4 intrinsic viscosity polyacrylamide at a weight ratio of premix to polymer of 1:1 had a cationicity from 62 to 73%. At a weight ratio of 1.5:1 the cationicity was from 76 to 84%. At a weight ratio of 2:1 the cationicity was from 80 to 86%. The 5.4 intrinsic viscosity polyacrylamide has a molecular weight around 2 million.

Thus, the products in the active solutions produced by the process all had a cationicity of at least 60%.

EXAMPLE 23

Compositions prepared in accordance with the invention were found to be effective in settling black liquor produced from titanium bearing slag from steel making processed by the sulfate process to produce pigment grade titanium dioxide. In this process the ground ore is reacted with sulfuric acid to convert the titanium into the soluble sulfate salt. This digestion solution is called "black liquor." Black liquor is coagulated by adding chemicals or polyelectrolytes. The clarified black liquor is decanted and the underflow mud is filtered and discarded.

Cationized products made from a 1:1 molar ratio of dimethylamine-formaldehyde premix reacted in a 1:2 solids weight ratio of pH9 premix to nonionic polyacrylamide having low or high intrinsic viscosities as described in Example 22 were found to be effective in clarifying said black liquor at dosages of 15, 25 and 35 mg/liter based on polymer solids. In a comparative test with a commercial product, the compositions of the present invention were superior.

The compositions prepared in accordance with the invention are aqueous liquids, usually containing a concentration of active cationized polymer within the range of 1 to 10%, a pH within the range of pH 9 to 11 and a Brookfield viscosity at ambient temperatures of around 10,000–25,000. A typical composition may contain 7% active dimethylamine-formaldehyde adduct cationized 5.4 intrinsic viscosity polyacrylamide in which the weight ratio of adduct to polyacrylamide is 1:1 and the Brookfield viscosity is 12,000–16,000 centipoises.

While the invention has been described with respect to the use of a dimethylamine-formaldehyde adduct for cationizing the vinyl addition polymer, it will be understood that other secondary amines can be employed instead of dimethylamine, e.g., methylethylamine, dibutylamine, methylamylamine, methylaminoethanol, diethanolamine, morpholine and piperidine.

The products of the invention can be cationic or anionic or both cationic and anionic depending upon the type of adduct and the type of vinyl addition polymer used as starting materials.

The products of the invention are useful in the steel, paper, textile and mining industries and in the municipal waste treatment field, especially in primary and secondary clarification, sludge thickening by gravity or dissolved air flotation and sludge dewatering by vacuum filtration or centrifugation.

The invention is hereby claimed as follows:

1. A process of preparing a dispersion of a water soluble cationic power polymer which comprises diluting with water a water-in-oil emulsion of a water soluble acrylamide polymer containing 20% by weight to 50% by weight of said acrylamide polymer, adding to said diluted emulsion a surfactant and a premix of formaldehyde and a secondary amine selected from the group consisting of dimethylamine, methylethylamine, dibutylamine, methylamylamine, methylaminoethanol, diethanolamine, morpholine and piperidine, in which the ratio of formaldehyde to said secondary amine is within the range of 10:1 to 1:10, the dilution and resultant concentration of polymer being such that the concentration of resultant cationic polymer is 1 to 10% by weight and the formation of said cationic polymer occurs in not more than 20 minutes, the weight ratio of said premix to said acrylamide polymer being within the range of 1:2 to 2:1 and the resultant cationic polymer having a cationicity of at least 60%.

2. A process as claimed in claim 1 in which said premix is a formaldehyde-dimethylamine adduct.

3. A process as claimed in claim 1 in which said premix is a formaldehyde-dimethylamine adduct and said acrylamide polymer is nonionic polyacrylamide.

4. A process as claimed in claim 1 wherein the mixing of said premix and said emulsion is performed at a pH greater than 7.0.

5. A process as claimed in claim 1 wherein said premix and said emulsion are mixed at a pH within the range of 9 to 11.0.

6. A process as claimed in claim 1 wherein the mixing of said premix and said emulsion is effected at temperatures of about 40° to 70° F.

7. A process as claimed in claim 1 wherein said premix contains formaldehyde and dimethylamine in a molar ratio of 1:1 and said acrylamide polymer is a nonionic water soluble polyacrylamide, said premix is mixed with water and a surfactant before being added to said emulsion, said premix containing said surfactant is gradually added to said emulsion and the resultant mixture vigorously agitated for not more than 20 minutes, the temperature of the resultant mixture being about 40° to about 70° F., and the molecular weight of said polyacrylamide being within the range of about 2–14 million.

8. The product resulting from the process of claim 1.

9. The product resulting from the process of claim 2.

10. The product resulting from the process of claim 7.

* * * * *

UNITED STATES PATENT AND TRADEMARK OFFICE
CERTIFICATE OF CORRECTION

PATENT NO. : 4,013,606
DATED : March 22, 1977
INVENTOR(S) : EDWARD G. BALLWEBER and KENNETH G. PHILLIPS It is certified that error appears in the above-identified patent and that said Letters Patent are hereby corrected as shown below:

Column 10, line 53, after "cationic" cancel --power--.

Signed and Sealed this twelfth Day of July 1977

[SEAL]

Attest:

RUTH C. MASON
*Attesting Officer*

C. MARSHALL DANN
*Commissioner of Patents and Trademarks*